Patented July 7, 1931

1,813,649

UNITED STATES PATENT OFFICE

PAUL WEISE, OF WIESDORF-ON-THE-RHINE, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

DEHYDRATION AND DECOMPOSITION OF IRON SULPHATES

No Drawing. Application filed January 5, 1929, Serial No. 330,621, and in Germany January 9, 1928.

The present invention relates to a process for the dehydration and decomposition of iron sulphates.

The dehydration and decomposition of the ferrous sulphate, crystallizing with seven molecules of water, proceeds in three stages, if this compound is heated in an oxidizing atmosphere such as air; first, the salt is dehydrated, then the salt oxidizes to form ferric salt, and then the ferric salt decomposes to form $SO_3$ and ferric oxide.

The technical dehydration and decomposition of iron sulphates, especially of ferrous sulphate $FeSO_4.7H_2O$, in mechanical ovens suffered from various disadvantages up to this day.

As $FeSO_4.7H_2O$, when being dehydrated, melts in its own water of crystallization, mechanical ovens, especially the rotary furnace, could not be used heretofore, since either the melted mass passed unhindered through the rotary furnace or adhered tenaciously to the wall and caused the oven in a short time to smear or become greasy and clog up. For these reasons, it has also been impossible to carry out any oxidation process subsequent to the dehydration or subsequent to the decomposition. Furthermore, the processes suffered from the disadvantage that decomposition products, as $SO_3$, dissociated into $SO_2$ and $O_2$ on account of the high decomposition temperature. Consequently, only poor yields of $SO_3$ could be obtained.

According to the present invention these disadvantages are removed by adding to the ferrous sulphate to be dehydrated a substance which diminishes the plasticity and which does not prejudicially interfere with the kind and quality of the solid decomposition product, the most favorable substance for the purpose of my invention being the partially dehydrated ferrous sulphate of the formula: $FeSO_4.1H_2O$, or ferric oxide, which latter acts in my process at the same time as an oxidizing catalyst. The quantity of the substance diminishing the plasticity may be varied within wide limits, at least about 10% calculated on the amount of the ferrous sulphate being required generally, I add an amount of from about 10% to about 30%.

As the $SO_3$, evolved at the decomposition temperature of the ferric salt, partially dissociates into $SO_2$ and $O_2$, an oxidizing catalyst may be added, in order to recover the sulfuric acid of the ferrous sulphate in the form of $SO_3$; a suitable catalyst is, for example, ferric oxide. In case ferric oxide is added as an agent for diminishing the plasticity in the dehydrating process, this acts at the same time as a catalyst. Under certain conditions, as, for example, in the presence of free sulfuric acid adhering to the ferrous sulphate, it is advantageous to add to the mixture small amounts of an acid binding agent, say 1% to 5%, such as an alkali- or alkaline earth metal oxide, hydroxide or carbonate, whereby an evaporation of the sulfuric acid is hindered; free sulfuric acid would unfavorably influence the quality of the ferric oxide obtained in my process.

My process may preferably be performed in a rotary furnace, in which the upper part acts as dehydrating zone, the medium part as oxidizing zone, and the lower parts as decomposing zone. The best results are obtained in using at least three separated rotary furnaces, the first furnace being heated to a temperature of from about 100° to about 200° C. and serving to dehydrate the ferrous sulphate to form $FeSO_4.H_2O$, the second furnace being directly heated with oxidizing gases to about 300° to 400° C. and serving to form ferric sulphates, and the third rotary furnace being indirectly heated to about 750° to about 800° C.

According to my process it is possible to work up ferrous sulphate in a mechanical oven into ferric oxide suitable to be used as a pigment and to recover almost completely the sulfuric acid in the form of $SO_3$.

The invention is illustrated by the following examples, without being limited thereto:

*Example 1.*—Ferrous sulphate ($FeSO_4.7H_2O$) is mixed with 20–30% of its weight of iron oxide ($Fe_2O_3$), the latter obtained by decomposition of ferrous sulphate, and the mixture is subjected to a drying process in a revolving furnace at a temperature of from about 100° to about 200° C. After the drying, the mixture is placed in a second rotary furnace in which it is slowly heated through one or more stages and in an oxidizing atmosphere up to a temperature of about 300° to 400° C., to form ferric sulphate. The ferric compound is placed in a third rotary furnace wherein it is indirectly heated to the decomposition temperature of the ferric salt, for instance to 750° to 830° C. Light iron oxide, suitable to be used as a pigment, is obtained and at the upper end of the rotary furnace $SO_3$ escapes.

*Example 2.*—Ferrous sulphate ($FeSO_4.7H_2O$) (with the addition of $FeSO_4$ or 25% $FeSO_4.1H_2O$) is mixed with 1% of sodium carbonate and, depending on the amount of $FeSO_4$ or $FeSO_4.1H_2O$ further, is mixed with 10–30% by weight of iron oxide and treated as described in Example 1.

I claim:

1. In the process for the dehydration and decomposition of iron sulphates the step which comprises heating a mixture of iron sulphate and 10–30% of a solid, iron-containing decomposition product of iron sulphate, to a temperature of between about 100–200° C.

2. In the process for the dehydration and decomposition of iron sulphates the step which comprises heating a mixture of iron sulphate and 10–30% of a solid, iron-containing decomposition product of iron sulphate, to a temperature of between about 100–200° C. in a rotary furnace.

3. In the process for the dehydration and decomposition of iron sulphate the step which comprises heating a mixture of iron sulphate and 10–30% $FeSO_4.1H_2O$ to a temperature of between about 100–200° C.

4. In the process for the dehydration and decomposition of iron sulphate the step which comprises heating a mixture of iron sulphate and 10–30% $FeSO_4.1H_2O$ to a temperature of between about 100–200° C. in a rotary furnace.

5. The process for the dehydration and decomposition of iron sulphates which comprises heating a mixture of iron sulphate and 10–30% of at least one solid, iron-containing decomposition product of iron sulfate, to a temperature of between about 100–200° C., heating the dehydrated mixture in an oxidizing atmosphere to a temperature of between about 300–400° C. in the presence of an oxidizing catalyst, and heating the oxidized mixture to a temperature of between about 750–830° C.

6. The process for the dehydration and decomposition of iron sulphates which comprises heating a mixture of iron sulphate and 10–30% of a mixture of $FeSO_4.1H_2O$ and iron oxide ($Fe_2O_3$) to a temperature of between about 100–200° C., heating the dehydrated mixture in an oxidizing atmosphere to a temperature of between about 300–400° C., and heating the oxidized mixture to a temperature of between about 750–830° C.

7. The process for the dehydration and decomposition of iron sulphates which comprises heating a mixture of iron sulphate and 10–30% of at least one solid, iron-containing decomposition product of iron sulphate, to a temperature of between about 100–200° C., heating the dehydrated mixture in an oxidizing atmosphere to a temperature of between about 300–400° C. in the presence of an oxidizing catalyst, and heating the oxidized mixture to a temperature of between about 750–830° C., the three heating processes being effected in rotary furnaces.

8. The process for the dehydration and decomposition of iron sulphates which comprises heating a mixture of iron sulphate and 10–30% of a mixture of $FeSO_4.1H_2O$ and iron oxide ($Fe_2O_3$) to a temperature of between about 100–200° C., heating the dehydrated mixture in an oxidizing atmosphere to a temperature of between about 300–400° C., and heating the oxidized mixture to a temperature of between about 750–830° C., the three heating processes being effected in rotary furnaces.

In testimony whereof I have hereunto set my hand.

PAUL WEISE. [L. S.]